United States Patent [19]

Chang

[11] Patent Number: 5,131,622
[45] Date of Patent: Jul. 21, 1992

[54] METERING VALVE FOR WATER FAUCET

[76] Inventor: Shih-Chih Chang, 2339 Davison Ave., Richland, Wash. 99352

[21] Appl. No.: 621,385

[22] Filed: Dec. 3, 1990

[51] Int. Cl.$^5$ ............................................ F16K 31/363
[52] U.S. Cl. ................................... 251/43; 251/339; 251/40; 119/72.5; 222/509; 222/518
[58] Field of Search ............. 251/43, 339, 40, 52; 119/72, 72.5, 75; 137/801; 222/322, 501, 448, 449, 450, 509, 518

[56] References Cited

U.S. PATENT DOCUMENTS

| | | | |
|---|---|---|---|
| 2,710,736 | 6/1955 | Miller | 251/52 X |
| 2,991,795 | 7/1961 | Fraser et al. | 251/52 X |
| 4,512,551 | 4/1985 | Dalferth | 251/339 |
| 4,784,368 | 11/1988 | Koch et al. | 251/52 X |
| 4,940,206 | 7/1990 | Sheen | 251/339 X |
| 4,981,160 | 1/1991 | Sen-Tein | 251/339 X |

Primary Examiner—Martin P. Schwadron
Assistant Examiner—Kevin L. Lee

[57] ABSTRACT

A metering valve for water faucet that is triggered at the water discharge by a light touch on the trip stem so that the hand that triggers the valve is ready at the washing position at the start of the water flow. The disclosed metering valve consists of a trip stem which penetrates through the valve outlet port to the exterior of the valve. There is a pressure chamber wherein the pressure controls the open and closure of the valve. The pressure in the pressure chamber is determined by means of feed and bleed. In the closure mode the bleed opening is blocked and the pressure chamber is pressurized by the water supply through the feed. A light touch on the trip stem causes the bleed to open and a depressurization in the pressure chamber. This opens the valve and starts a metering cycle. After the trip stem is release, the bleed is blocked again and the pressure chamber starts to recover its pressure slowly through the feed flow path. The pressure in the pressure chamber, when it is fully recovered, closes the valve and completed a metering cycle.

6 Claims, 2 Drawing Sheets

METERING VALVE FOR WATER FAUCET

BACKGROUND OF THE INVENTION

The use of metering valves for water faucet have many potential advantages over the conventional manually operated valves. A metering valve closes automatically after it allows a predetermined quantity of water flow. This special feature can result in water saving by reducing excessive water running and also by eliminating water running unattended due to user negligence or vandalism.

In many commercial and public buildings metering valves are installed for hand washing faucets. A typical design of existing metering valves has a push button on the top of the valve body. Once the button is pushed down, the water flow starts and it continues for a short moment and then stops automatically. The user has to first push button at the top of the valve to start a wash cycle and then move his hand, while the water is running, to the position underneath the valve, in order to receive the water. By doing so, a portion of water is wasted before the user can reach the running water. Normally the vale is adjusted to run only for a very short period. Frequently, the water stops in the middle of hand washing. Therefore, the user has to reach the top of the valve and push the button again. This not only wasted a lot water in between, but causes inconvenience to the users, transfers germs and also soils the valves with soap residues. Most users have various frustrating experiences with existing metering valves and this is the primary reason that metering valves have not been popular in spite of its potential advantages.

To better benefit the user and save water, it is most desirable that the water could be triggered at a suitable location, such as near the running water, so that the hand would be ready to receive water right at the start of water flow. If the water stops in the middle of hand washing, the cycle should be able to restarted conveniently and without removing the hand from its washing position. Then, the water can be fully utilized and, at the same time, the other inconveniences with conventional metering valves can be eliminated.

OBJECTS OF THE INVENTION

The main object of the present invention is to provide a metering valve for water faucet that saves water and provides user's convenience.

A specific object of the present invention is to provide a metering valve that can be triggered to open by hand at a position near the running water position so that the hand is ready to receive water when the valve opens.

Another specific object of the present invention is to provide a metering valve which allows the user to restart the water running cycle without removing the hand from the washing position.

Still another specific object of the present invention is to provide a metering valve that requires only minimum effort to open.

Still another specific object of the present invention is to provide a metering valve which is simple in design and reliable in operation.

DESCRIPTION OF THE INVENTION

The disclosed valve has a trip stem which extends from the water outlet of the valve to the exterior of the valve and the valve cycle is triggered to start at the water discharge position. Thus, the hand, which trips the valve to open, receives water at the same position. The disclosed valve consist of a metering mechanism that causes the valve to close automatically after a desired period of water running.

The hydraulic design of metering mechanism relies on a pressure balancing chamber which controls the position of the valve disc which is turn controls the opening and closure of the valve.

The valve disc is a plug type disc and it moves in the axial direction to open or close the valve. When the valve is closed, the valve disc blocks the flow from the downstream side which divides the valve body into two isolated zones - the high pressure upstream zone and the low pressure downstream zone. In the closure mode the front end of the disc engages into the valve seat and the central section of the front end senses high pressure of the supply water. The pressure balance chamber is positioned further downstream from the valve seat. A hydrostatic force resulted by the pressure of the chamber is transmitted to the back side of the disc so that the disc motion can be manipulated by pressure variation in the chamber in a manner that when the chamber has a sufficiently high pressure, the valve disc moves forwards to close the valve and when the chamber pressure is low, the disc is pushed open by the supply water pressure.

The pressure in the chamber is basically controlled by the balance of feed and bleed; a narrow flow path that communicates with the upstream high pressure functioning as the feed and a pilot valve that communicates chamber with the downstream low pressure controls the bleed. The narrow feed path allows the chamber to pressurized slowly and the pilot valve can cause a sudden de-pressurization when it is tripped to open. The feed is always open so that, when the pilot valve is closed, the chamber pressure tends to balance with the upstream valve pressure therethrough. When the chamber is pressurized, the hydrostatic force supports the piston and the disc which seals the valve.

The pilot valve connects the interior of the chamber to the low pressure zone of the valve downstream. Opening of the pilot valve causes a sudden release of water from the chamber to the low pressure zone which de-pressurizes the chamber. Then, the supporting force of the disc is drastically reduced and water pressure pushes back the disc and causes the valve to open.

The pilot valve is so designed that when the tripping action is removed, it closes automatically. After the closure of the pilot valve, the chamber starts to recover its pressure through the narrow flow path. Water seeps through the narrow flow path into the chamber which refills the chamber slowly and, at the same time, increases the pressure therein. The increased pressure in the chamber pushes the piston and the valve disc moving slowly toward the valve seat. Meanwhile, the water flows continuously until the valve disc reaches the valve seat.

The pilot valve, which controls the bleed of the pressure chamber, comprises a trip stem that extends from the valve body to the outside of the discharge port of the valve. The water metering cycle is initiated by a light tap on the stem which opens the bleed of the pressure chamber which consequently causes the valve to open. Then the hand that trips the stem is readily at the position for receiving water discharging from the valve. After the water stops, if desired, the user can start a new cycle by tapping the stem again to start a new metering cycle without removing the hand from the washing position.

DESCRIPTION OF THE PREFERRED EMBODIMENTS

Figure 1:
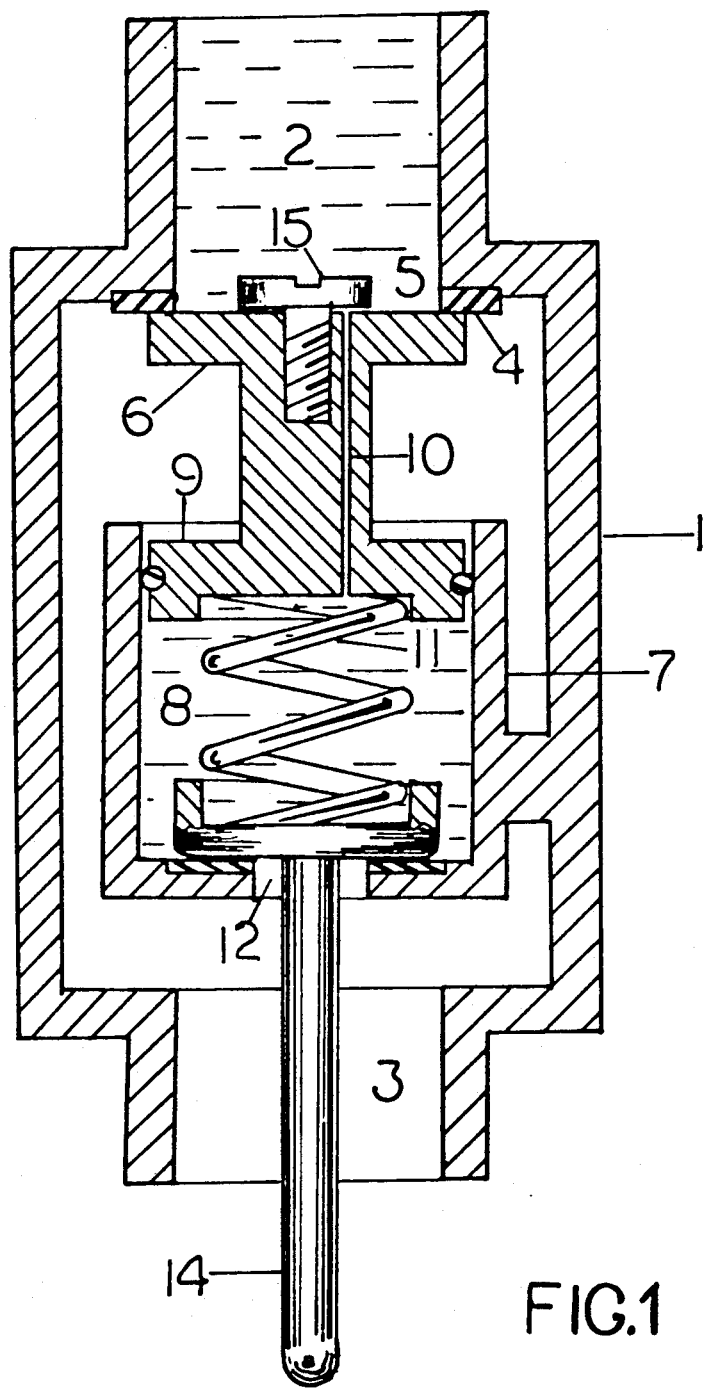
FIG. 1 is a cross-section view of a preferred embodiment of the disclosed metering valve, in accordance with the present invention, wherein the valve is in the closure mode.

Refer to FIG. 1, valve body 1 defines a flow passage through an inlet port 2 to an outlet port 3. The inlet port is to be connected to a water supply and the outlet discharges to a receiving sink. The valve consists of a valve seat 4 affixed to the valve body and the seal surface faces the downstream direction. The valve seat forms a central opening 5 so that water can flow therethrough when the valve is open. The valve disc 6 is a plunger type disc which is positioned downstream of the valve seat and it is movable in the longitudinal direction. The front end of the valve disc is larger than the opening 5 so that the valve disc can completely cover the opening when the valve is engaged with the valve seat and thereby cause the valve to closed. There is a pressure chamber 7 with a cylindrical cavity 8. The pressure chamber is affixed to the valve body downstream of the valve seat. A piston 9 is designed to fit in the cavity and it is mechanically connected with the valve disc so that the hydraulic pressure force of the cavity, applied on the piston, is transmitted to the valve disc and the valve disc moves with the piston.

There is a narrow flow path 10 which communicates the interior of the pressure chamber with the upstream water of the valve seat. When the valve is closed, the pressure inside the chamber is balanced with the high upstream pressure of the valve seat, through the narrow flow path 10. The cross-sectional area of the piston is designed slightly larger than the area of the seat opening. Under this condition the pressure force applied on the front face of the valve disc is out balanced by piston force which is resulted from the pressure in the chamber. The spring 11 provides additional force pressing the valve disc onto the valve seat.

The metering valve is to be opened by a sudden reduce of pressure in the pressure chamber 7. The pressure in the pressure chamber is controlled by means of feed and bleed. There is bleed opening 12 and a bleed control plug 13. The bleed control plug functions as a pilot valve for the metering valve which is mechanically linked with a trip stem 14. The bleed opening 12 is normally blocked by the plug 13 in the valve closure mode.

Figure 2:
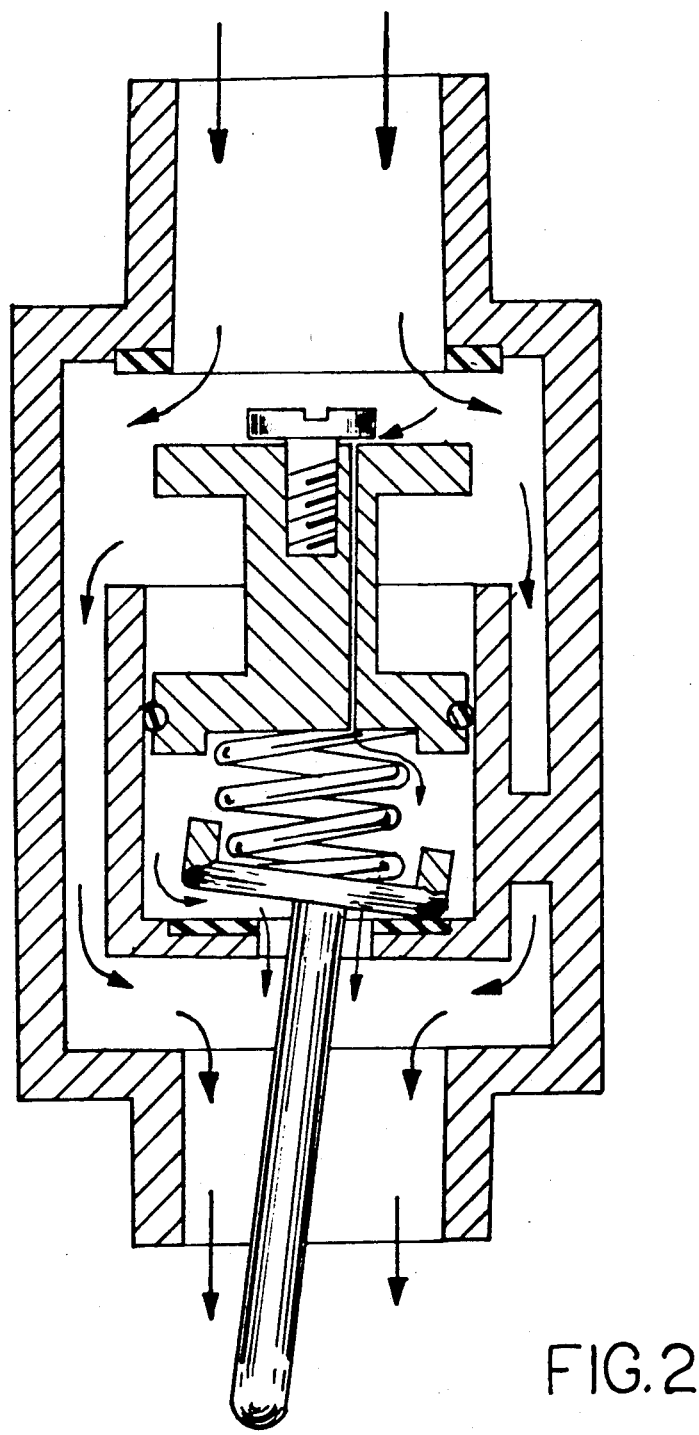
FIG. 2 shows the same preferred embodiment, when the valve is tripped to open.

In using the metering valve, a wash cycle is triggered by a light tap on the trip stem 14 to one side, as show in FIG. 2, which opens the bleed opening 12. Due to the pressure difference, a bleed flow from the pressure chamber to the outlet port 3 is resulted. The bleed flow depressurizes the pressure chamber 7 and consequently causes the valve disc 6 to retract with the piston 9 and thereby allows the water to flow through the valve seat opening 6.

As soon as the trip stem is released, the plug 13 recovers automatically by the spring force to its normally closed position which stops the bleed flow. This allows the chamber to start to regain its pressure by drawing a small feed flow through the narrow flow path 10. While the water is running through the metering valve, the incoming feed flow to the pressure chamber pushes the piston and the valve disc to move slowly towards the valve seat and finally engages with the valve seat. This shuts off the water and completes a metering cycle.

The flow resistance of the narrow flow path plays an important role in the controlling the length of the metering cycle. Because the resistance determines the feed flow rate to the pressure chamber which in turn controls the progress of closure motion of the valve disc. Clearly, a higher resistant path results in a slower feed flow and a longer metering time. The preferred embodiment further consists of an adjustable screw 15 which can be set for adjusting the flow resistance of the feed flow path and consequently the length of the metering cycle.

I claim:

1. A metering valve for water faucet which comprises a valve body defining a flow passage therethrough having an inlet port to be connected to a pressurized water supply and an outlet port for discharging said water, a valve seat, a valve closure member movable into engagement with said valve seat, a metering mechanism for controlling the movement of said closure member and thereby providing a metering cycle of water flow, and a trip stem for triggering said metering cycle which extends out from said metering mechanism through said outlet port to the exterior of said valve body so that said trip stem can be reached by hand at the water discharge position; said metering mechanism comprises a pressure chamber with a narrow feed path communicating to the upstream of said valve seat and a bleed opening communicating to the downstream of said valve seat, a bleed control means for controlling said bleed opening which is connected to said trip stem in such a manner that a light touch on said trip stem causes said bleed control means to open temporarily which consequently depressurizes said pressure chamber, there is a piston means connected to said valve closure member; the movement of said piston means is driven by said pressure in said pressure chamber in such a manner that said piston means extends outward to cause said valve closure member to engage with said valve seat when said chamber is pressurized and said piston means retracts to cause said metering valve to open when said chamber is depressurized; in the closure mode of said metering valve, said bleed control means closes said bleed opening and said chamber is pressurized by said supply water through said feed narrow flow path; when trip stem is touched by a user, the bleed control means opens said bleed opening and allows the water in said chamber to bleed out and thereby depressurizes said chamber; the depressurization of said chamber causes said valve closure member to retract and consequently opens said metering valve; then said pressure of said chamber recovers by drawing a feed flow through said narrow feed path, said feed flow re-pressurizes said chamber gradually and, at the same time, pushes said valve closure member towards said valve seat and finally causes said valve to close and thereby completing said metering cycle.

2. A metering valve as in claim 1, wherein it further comprises an adjustable means for controlling the flow resistance of said narrow flow path.

3. A metering valve as in claim 1, wherein the cross-sectional area of said piston is slightly greater than the area of the opening of said valve seat so that the force applied on said front end of said valve closure member by said supply water is substantially counterbalance by said hydrostatic force of said pressure in said cavity when said chamber is pressurized.

4. A metering valve as in claim 1, wherein said metering mechanism comprises further a spring means for providing a mechanical force in the direction to push said closure member against said valve seat which assist to seal said valve in said closure mode.

5. A metering valve as in claim 1, wherein said bleed control means is a spring loaded plug which normally blocks said bleed opening; said plug is mechanically linked to said trip stem such that a light touch on said trip stem causes said plug to unblock said bleed open.

6. A metering valve as in claim 1, wherein said pressure chamber is affexed to said valve body downstream of said valve seat and said valve closure member engages to said valve seat from the downstream side of said valve seat.

* * * * *